(12) United States Patent
Miller

(10) Patent No.: US 9,423,028 B2
(45) Date of Patent: Aug. 23, 2016

(54) PISTON RING

(71) Applicant: Federal-Mogul Corporation, Southfield, MI (US)

(72) Inventor: Andrew John Miller, Plymouth, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/453,849

(22) Filed: Aug. 7, 2014

(65) Prior Publication Data

US 2015/0042046 A1   Feb. 12, 2015

Related U.S. Application Data

(60) Provisional application No. 61/863,007, filed on Aug. 7, 2013.

(51) Int. Cl.
*F16J 9/12* (2006.01)
*F16J 1/09* (2006.01)
*F16J 9/14* (2006.01)
*F16J 9/22* (2006.01)

(52) U.S. Cl.
CPC .... *F16J 9/12* (2013.01); *F16J 1/09* (2013.01); *F16J 9/14* (2013.01); *F16J 9/22* (2013.01)

(58) Field of Classification Search
CPC .................. F16J 9/00; F16J 9/12; F16J 9/14; F16J 9/20
See application file for complete search history.

(56) References Cited

U.S. PATENT DOCUMENTS

| | | | |
|---|---|---|---|
| 1,229,498 A | 6/1917 | Moratta |
| 1,292,101 A | 1/1919 | Shaw |
| 1,397,334 A | 11/1921 | Schmolinski |
| 1,489,335 A | 4/1924 | Seifert |
| 1,919,183 A | 7/1933 | Paton |
| 2,092,413 A | 9/1937 | Farmer |
| 2,688,522 A | 9/1954 | Hoyt |
| 2,768,865 A | 10/1956 | Baker |
| 2,970,023 A | 1/1961 | Thompson |

(Continued)

FOREIGN PATENT DOCUMENTS

| | | |
|---|---|---|
| DE | 694688 C | 8/1940 |
| DE | 3538978 C1 | 4/1987 |

(Continued)

OTHER PUBLICATIONS

International Search Report, mailed Jan. 12, 2015 (PCT/US2014/050070).

*Primary Examiner* — Gilbert Lee
(74) *Attorney, Agent, or Firm* — Robert L. Stearns; Dickinson Wright, PLLC

(57) ABSTRACT

An improved piston ring for use as an intermediate piston ring in a piston assembly having three or more piston rings is provided. The piston ring includes a piston ring body which extends through an arcuate shape between opposite end faces. The piston ring body has at least one combustion gas guidance feature for allowing a greater flow of combustion gasses to pass the piston ring body when the piston is moving in one direction and for allowing a lesser flow of combustion gasses to pass the piston ring body when the piston is moving in an opposite direction. This allows for the ring gap at the outer diameter of the piston ring to be minimized without creating flutter in another piston ring above the intermediate piston ring during operation of an engine.

5 Claims, 8 Drawing Sheets

(56) References Cited

U.S. PATENT DOCUMENTS

| | | | |
|---|---|---|---|
| 4,449,721 A | 5/1984 | Tsuge | |
| 4,643,079 A | 2/1987 | Brann et al. | |
| 4,835,856 A * | 6/1989 | Azami | F04B 39/042 |
| | | | 29/428 |
| 4,848,212 A | 7/1989 | Kawano et al. | |
| 5,035,210 A * | 7/1991 | Arai et al. | 123/193.6 |
| 6,470,792 B1 * | 10/2002 | Michel | 92/208 |
| 6,651,606 B2 | 11/2003 | Han | |
| 6,675,762 B2 | 1/2004 | Han | |
| 6,726,217 B1 | 4/2004 | Issler | |
| 7,207,571 B2 | 4/2007 | Yoshida et al. | |
| 7,654,536 B2 | 2/2010 | Umetsu et al. | |
| 7,766,339 B2 | 8/2010 | Umetsu et al. | |
| 2002/0033579 A1 | 3/2002 | Ishida | |
| 2004/0012153 A1 | 1/2004 | Yoshida et al. | |
| 2007/0261658 A1 | 11/2007 | Abe et al. | |
| 2008/0252019 A1 | 10/2008 | Yu | |
| 2010/0162987 A1 | 7/2010 | Ishida | |
| 2013/0154196 A1 * | 6/2013 | Sytsma et al. | 277/434 |

FOREIGN PATENT DOCUMENTS

| | | |
|---|---|---|
| DE | 4327621 A1 | 2/1995 |
| JP | 61038266 | 2/1986 |
| JP | 62251457 | 2/1987 |
| JP | 62098070 | 7/1987 |
| JP | S632848 U | 1/1988 |
| JP | 4069458 | 3/1992 |

\* cited by examiner

PISTON RING

CROSS-REFERENCE TO RELATED APPLICATION

This application claims the benefit of application Ser. No. 61/863,007, filed on Aug. 7, 2013.

BACKGROUND OF THE INVENTION

1. Field of the Invention

The present invention is related generally to piston rings and more particularly to intermediate piston rings for disposition between at least two other piston rings in a piston assembly.

2. Related Art

Internal combustion engine manufacturers are encountering increasing demands to improve engine efficiencies and performance, including, but not limited to, improving fuel economy, improving fuel combustion, reducing oil consumption, increasing the exhaust temperature for subsequent use of the heat, increasing compression loads within the cylinder bores, decreasing weight and making engines more compact. In order to satisfy one or more of these demands, many engine manufacturers have been employing advanced technologies to increase the temperature and pressure loads within the combustion chambers of their engines. Consequently, such pistons must be sealed to their respective cylinder bores with piston rings that are designed to withstand the increasingly extreme environment.

Most pistons are sealed against their respective cylinder walls with three piston rings which are axially spaced from one another, and each piston ring is optimized to perform a specific task. Traditionally, the top ring is a compression ring optimized for sealing combustion gasses in the combustion chamber above the piston. The bottom ring is typically an oil control ring which is optimized for scraping the cylinder wall and keeping oil from passing into the combustion chamber. The second, or intermediate, ring typically serves the dual purposes of assisting the top compression ring in sealing the combustion gasses in the combustion chamber and also scraping any oil that made it past the oil control ring.

FIGS. 1 and 2 show a typical intermediate piston ring having a traditional butt joint. As shown, the closed gap between the ring ends of the top compression ring is smaller than the closed gap between the ring ends of the second ring. The purpose of the larger gap in the second ring is to relieve gas pressures between the top and second rings which could otherwise cause the top ring to flutter in the ring groove due to the increased inter-ring pressure. However, this larger total free gap will also reduce the second ring's oil scraping capabilities which could lead to increased oil consumption and also could result in reverse blow-by. There remains a continuing desire for an improved second piston ring capable of preventing flutter of the top ring without compromising the second piston ring's oil scraping and reverse blow-by resistance.

SUMMARY OF THE INVENTION AND ADVANTAGES

According to one aspect of the present invention, an improved piston ring for use as an intermediate piston ring in a piston assembly having three or more piston rings is provided. The piston ring includes a piston ring body which extends through an arcuate shape between opposite end faces. The piston ring body has at least one combustion gas guidance feature for allowing a greater flow of combustion gasses to pass the piston ring body when the gas is flowing towards the crankcase and for allowing a lesser flow when the gas is flowing in the opposite direction, towards the combustion chamber. This allows for the ring gap at the outer diameter of the piston ring to be minimized without creating flutter in another piston ring above the intermediate piston ring during operation of an engine.

Another aspect of the present invention provides for a piston assembly. The piston assembly includes at least two lands which are spaced axially from one another by a ring groove and wherein at least one of the lands presents a chamfer at an outer surface thereof. An intermediate piston ring is disposed in the groove between the lands, and the piston ring extends through an arcuate shape between opposite end faces. The intermediate piston ring includes at least one combustion gas guidance feature for allowing combustion gasses to flow past the piston ring through the chamfer when the piston assembly is moving in only one axial direction with the piston ring being seated against the at least one land with the chamfer.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
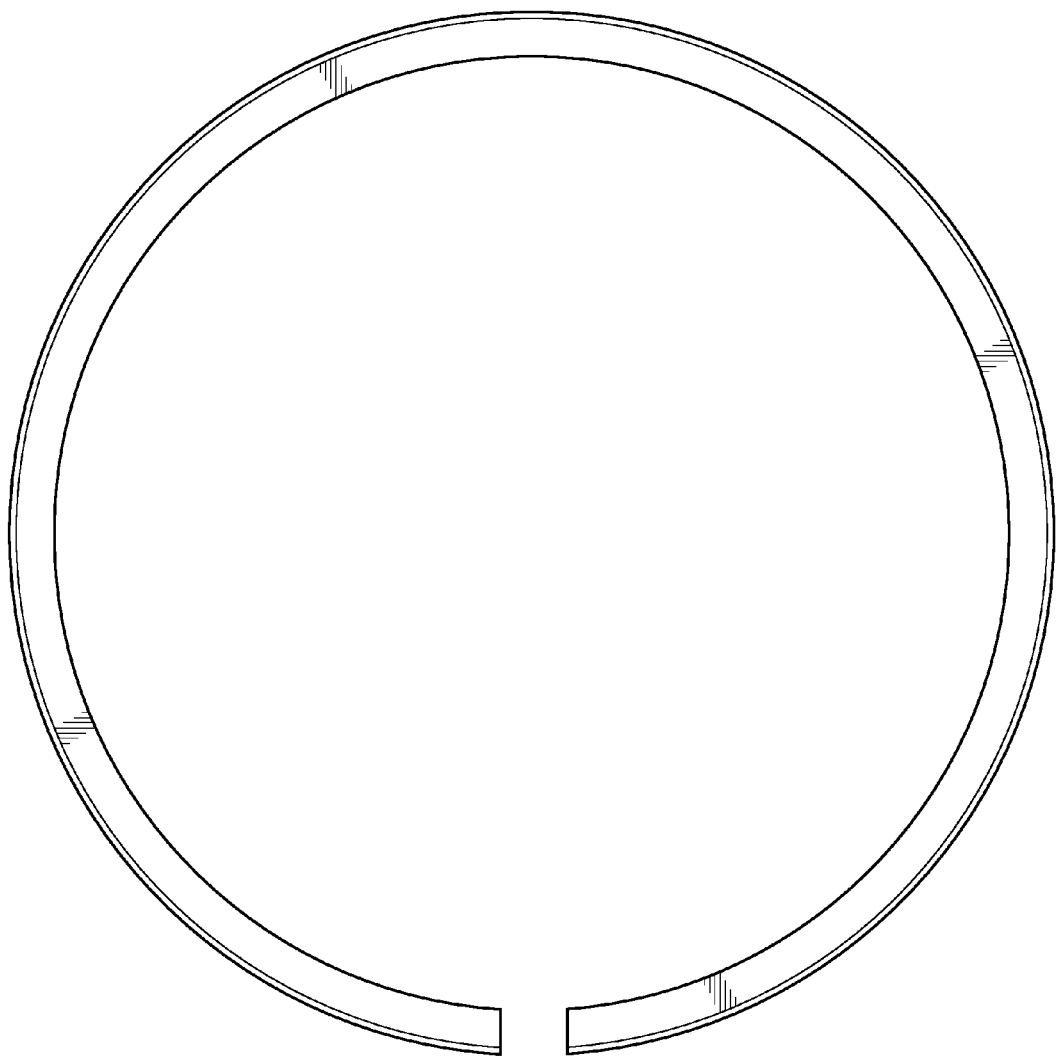
FIG. 1 is a top view of a prior art intermediate piston ring.
Figure 2:
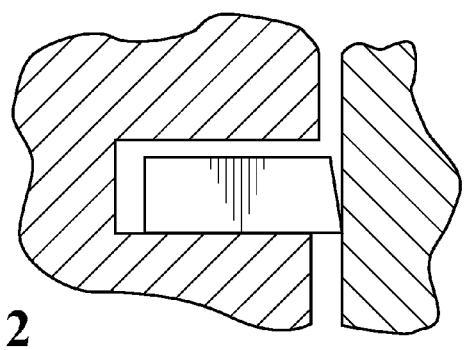
FIG. 2 is a cross-sectional view of the prior art intermediate piston ring shown in FIG. 1 and disposed in a piston during an upward stroke of a piston.
Figure 3:
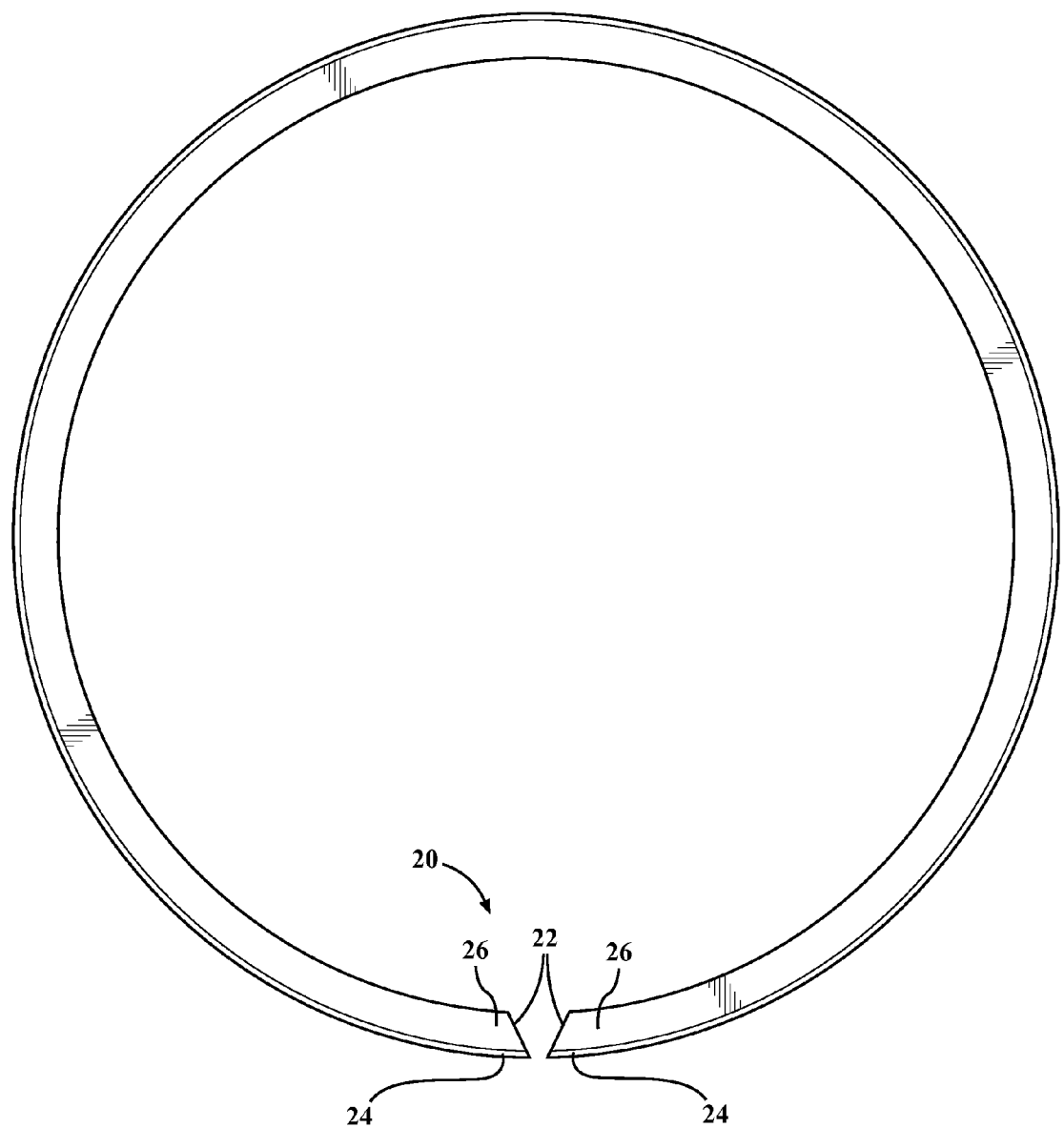
FIG. 3 is a top view of a first exemplary embodiment of an intermediate piston ring.
Figure 4:
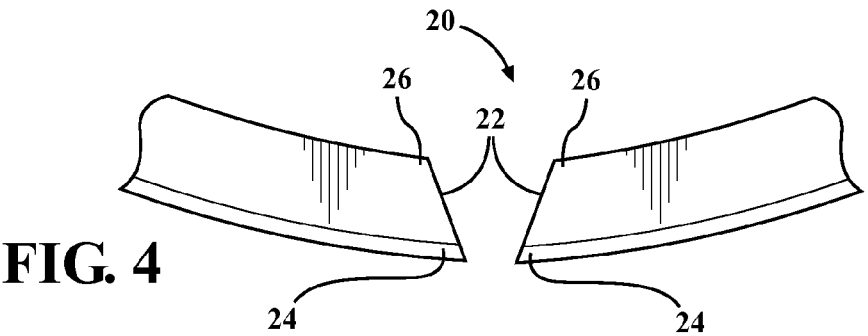
FIG. 4 is an enlarged top view of the first exemplary embodiment of the intermediate piston ring and centered on a ring gap.
Figure 5:
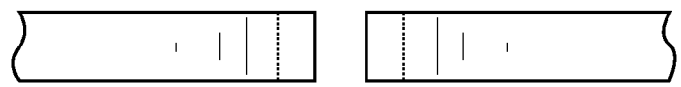
FIG. 5 is an enlarged front view of the first exemplary embodiment of the intermediate piston ring and centered on the ring gap.

Referring to the Figures, wherein like numerals indicate corresponding parts throughout the several views, a plurality of improved piston rings for use as intermediate piston rings of pistons with three or more piston rings are provided. The improved intermediate piston rings include combustion gas guidance features for allowing passage of combustion gasses from above the intermediate piston ring to below the intermediate piston ring to prevent flutter of a top piston ring disposed between the intermediate piston ring and a combustion chamber during operation of an engine while also offering improved oil scraping abilities as compared to other known intermediate piston rings while also. The improved intermediate piston rings have a reduced ring gap at their outer surfaces as compared to other known intermediate piston rings but also have certain unidirectional features for controllably conveying gasses from above the intermediate piston ring to below the intermediate piston ring while restricting gas flow in the opposite direction to prevent flutter of the top piston rings.

A first exemplary embodiment of the intermediate and semi-unidirectional gas sealing piston ring 20 for reducing gas pressure between the intermediate piston ring 20 and a lower piston ring (not shown) is generally shown in FIGS. 3-7. The end faces 22 of the exemplary piston ring 20 are angled such that the radially outer-most portions 24 or the radially outer edges of the end faces are disposed closer to one another than the radially inner-most portions 26 or the radially inner edges of the end faces. In other words, the end faces 22 converge towards one another from the inner-most edges 26 to the outer-most edges 24. This gives the closed gap a generally isosceles trapezoidal shape.

Figure 6:
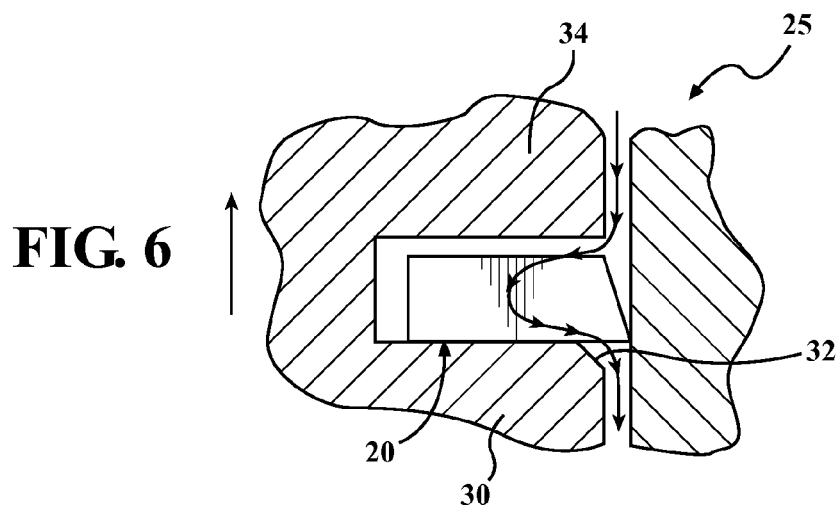
FIG. 6 is a cross-sectional view of the first exemplary embodiment of the intermediate piston ring and disposed in a piston during an upward stroke of the piston.
Figure 7:
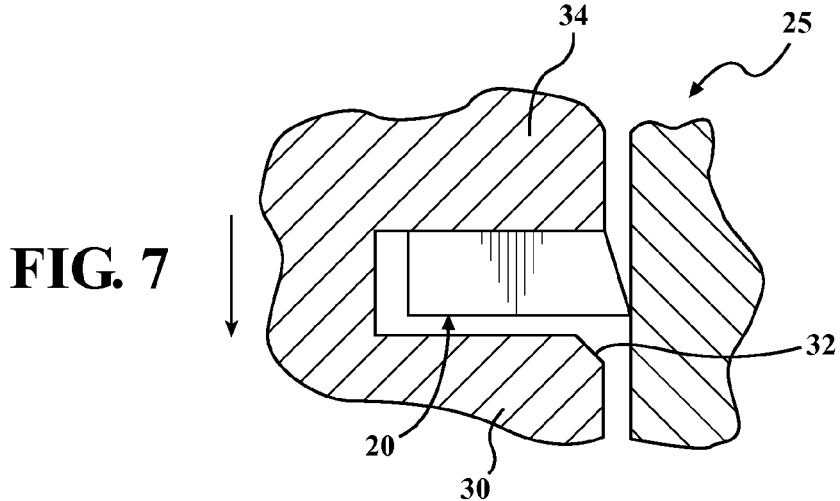
FIG. 7 is a cross-sectional view of the first exemplary embodiment of the intermediate piston ring and disposed in a piston during a downward stroke of the piston.

Referring now to FIG. 6, first exemplary embodiment of the piston ring 20 is shown in a ring groove and abutting a third land 30 of a piston body 25 during an upward stroke of the piston body 25 (for example, the compression or exhaust strokes of a four-stroke cycle). As shown, the upper surface of the third land 30 has a chamfer 32 and combustion gasses are flowing from above the exemplary piston ring 20 into the gap and to the space below the exemplary intermediate piston ring 20 through the chamfer 32 in the third land 30. Notably, because of the angled end faces 22 and the chamfer 32, an increased amount of combustion gasses is able to cross the piston ring 20 from the second land 34 to the third land 30 as compared to other known intermediate piston rings. This has the effect of reducing the risk of flutter of the top piston ring (not shown) above the exemplary intermediate piston ring 20. Referring now to FIG. 7, during the downward (intake and power) strokes, the piston ring 20 is pressed against the second land 34 and a lesser quantity of combustion gasses is able to pass the piston ring 20 in an upward direction, i.e., reverse blow-by of combustion gasses flowing from the third to the second lands 34 during these strokes is reduced. Additionally, the gap at the outer circumference of the piston ring 20 is minimized as compared to conventional intermediate piston rings which have butt joints, and therefore, the exemplary piston ring 20 offers improved oil scraping performance as compared to typical intermediate piston rings.

Like the first exemplary intermediate piston ring 20 described above, each of the following exemplary embodiments of intermediate piston rings 120, 220, 320, 420, 520 includes a feature to provide increased combustion gas flow during the upward (compression and exhaust) strokes and reduced combustion gas flow during the downward (intake and power) strokes of the piston 25, 125, 225, 325, 425, 525 in an internal combustion engine. As such, all of the exemplary piston rings 20, 120, 220, 320, 420, 520 reduces both flutter of the piston ring above the respective intermediate piston ring 20, 120, 220, 320, 420, 520 and reverse blow-by. Each of the below-described piston rings 120, 220, 320, 420, 520 also has a very small gap at its outer circumference to give it improved oil scraping performance as compared to other known intermediate piston rings, i.e., more of the cylinder wall is scraped by the outer circumference.

Figure 8:
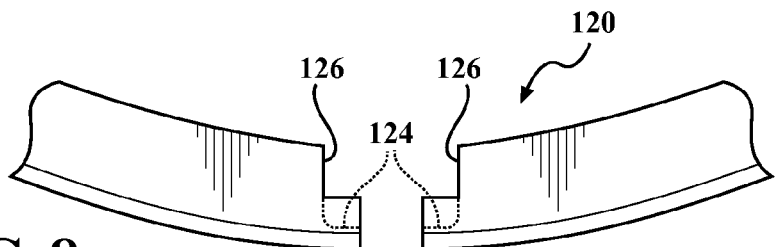
FIG. 8 is an enlarged top view of a second exemplary embodiment of the intermediate piston ring and centered on the ring gap.
Figure 9:
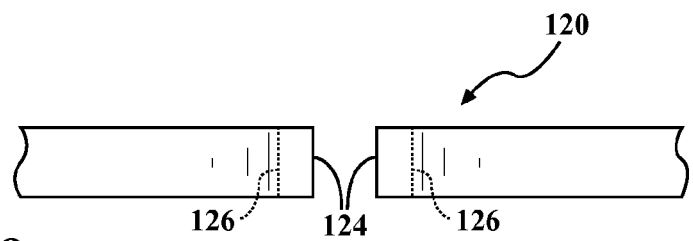
FIG. 9 is an enlarged front view of the second exemplary embodiment of the intermediate piston ring and centered on the ring gap.
Figure 10:
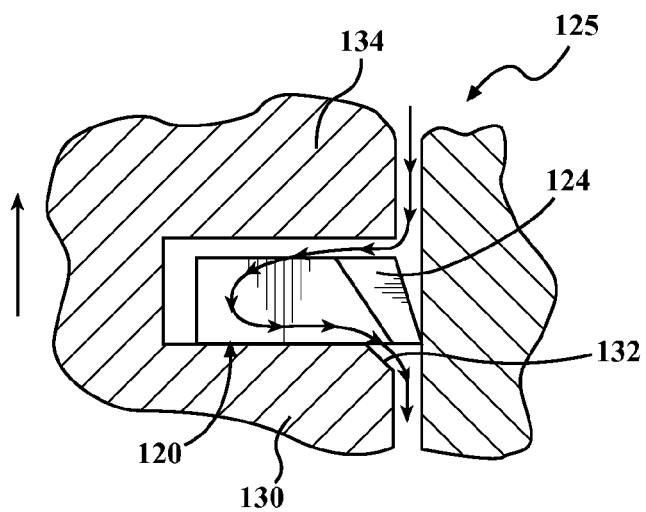
FIG. 10 is a cross-sectional view of the second exemplary embodiment of the intermediate piston ring and disposed in a piston during an upward stroke of the piston.
Figure 11:
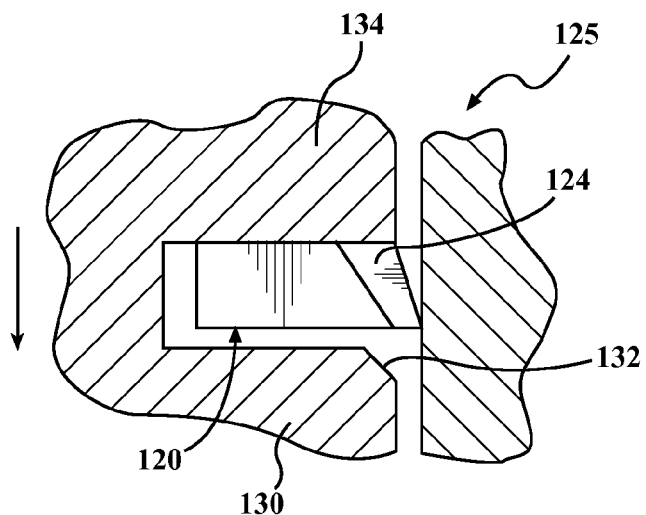
FIG. 11 is a cross-sectional view of the second exemplary embodiment of the intermediate piston ring and disposed in a piston during a downward stroke of the piston.
Figure 12:
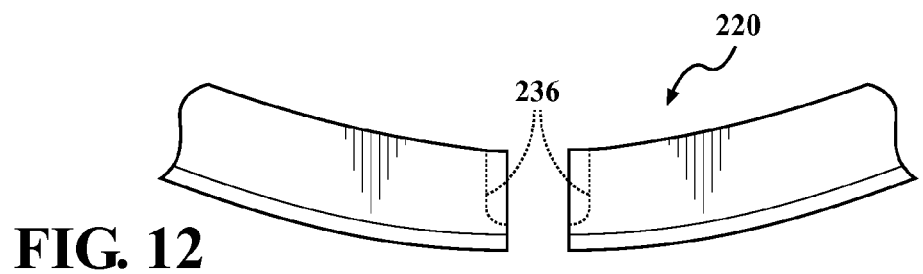
FIG. 12 is an enlarged top view of a third exemplary embodiment of the intermediate piston ring and centered on the ring gap.
Figure 13:
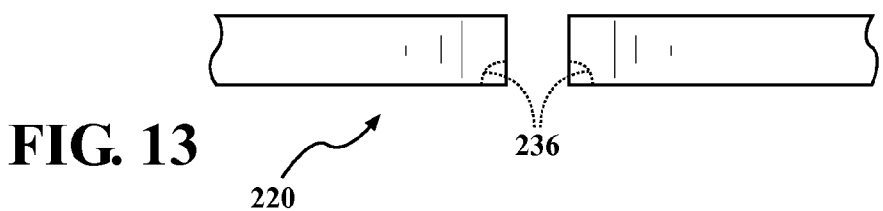
FIG. 13 is an enlarged front view of the third exemplary embodiment of the intermediate piston ring and centered on the ring gap.
Figure 14:
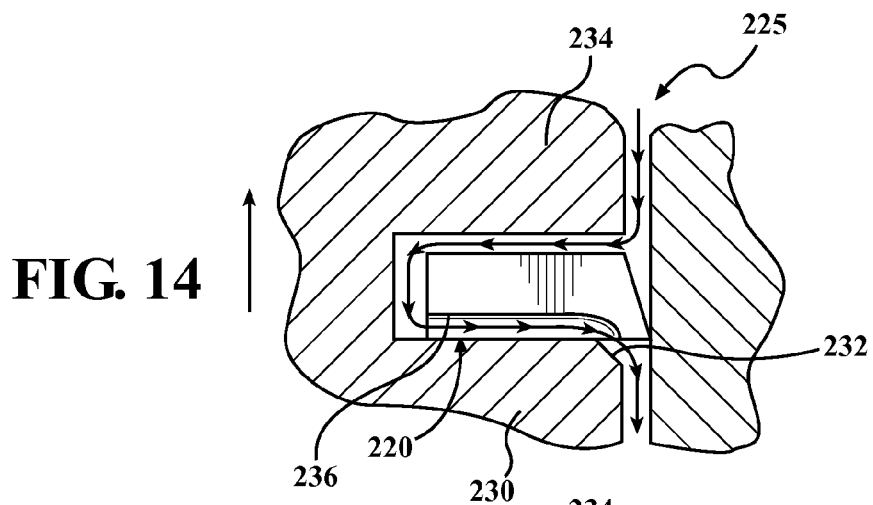
FIG. 14 is a cross-sectional view of the third exemplary embodiment of the intermediate piston ring and disposed in a piston during an upward stroke of the piston.
Figure 15:
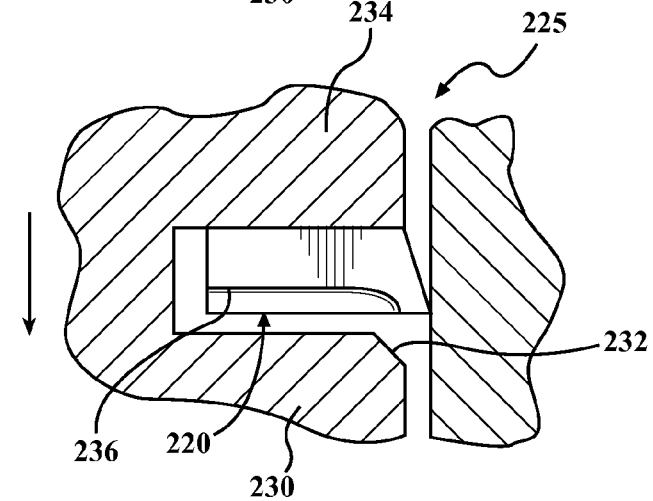
FIG. 15 is a cross-sectional view of the third exemplary embodiment of the intermediate piston ring and disposed in a piston during a downward stroke of the piston.
Figure 16:
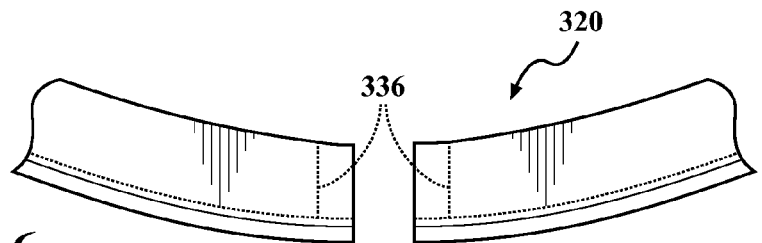
FIG. 16 is an enlarged top view of a fourth exemplary embodiment of the intermediate piston ring and centered on the ring gap.
Figure 17:
FIG. 17 is an enlarged front view of the fourth exemplary embodiment of the intermediate piston ring and centered on the ring gap.
Figure 18:
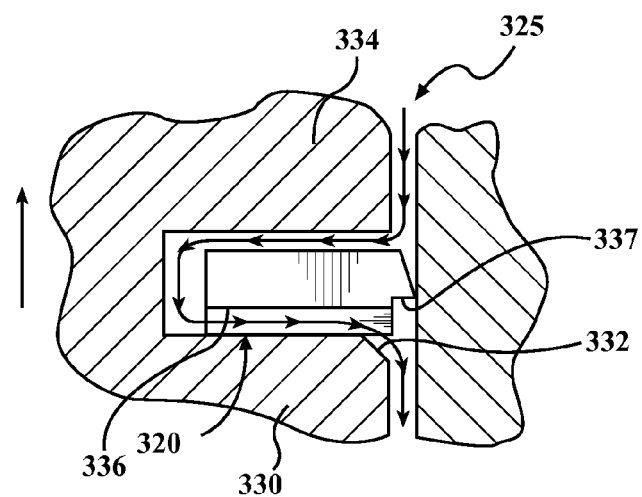
FIG. 18 is a cross-sectional view of the fourth exemplary embodiment of the intermediate piston ring and disposed in a piston during an upward stroke of the piston.
Figure 19:
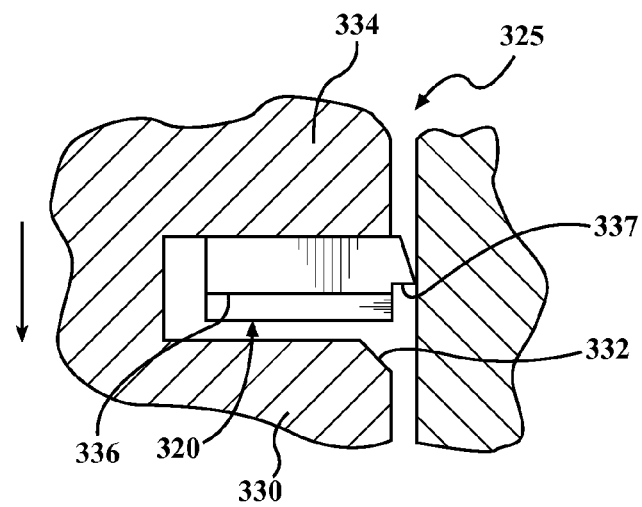
FIG. 19 is a cross-sectional view of the fourth exemplary embodiment of the intermediate piston ring and disposed in a piston during a downward stroke of the piston.
Figure 20:
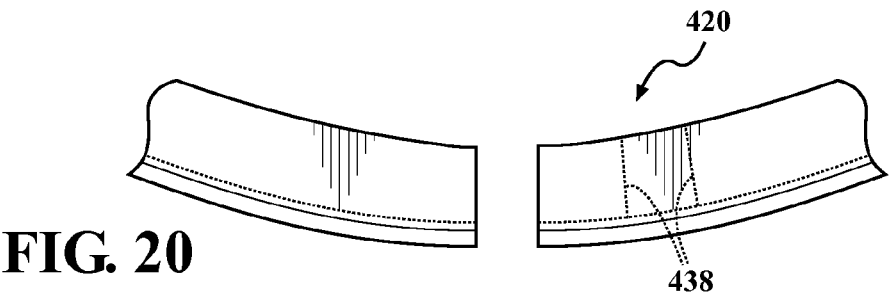
FIG. 20 is an enlarged top view of a fifth exemplary embodiment of the intermediate piston ring and centered on the ring gap.
Figure 21:
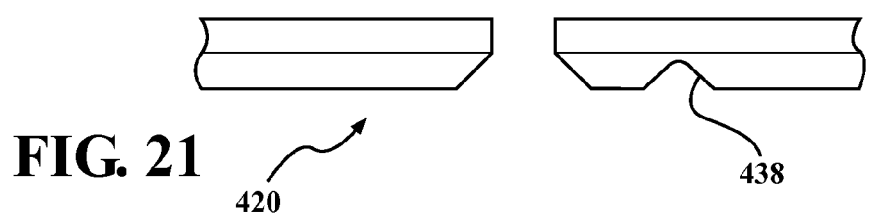
FIG. 21 is an enlarged front view of the fifth exemplary embodiment of the intermediate piston ring and centered on the ring gap.
Figure 22:
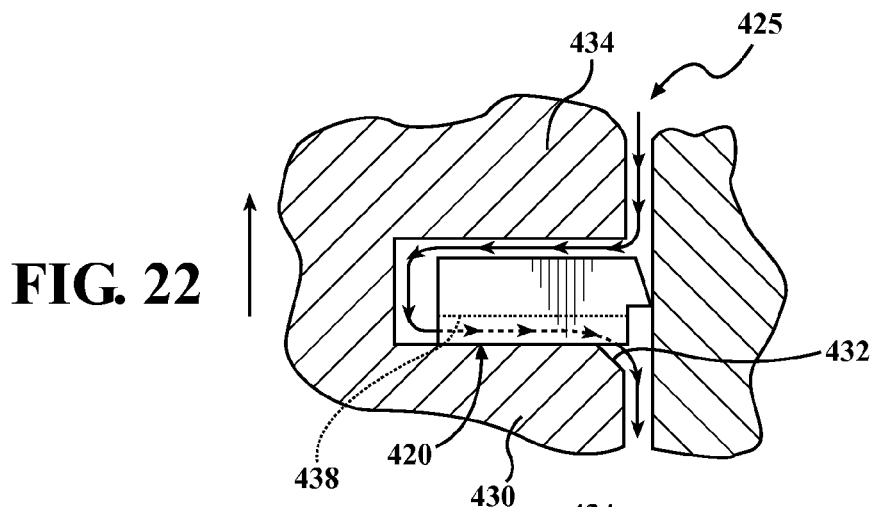
FIG. 22 is a cross-sectional view of the fifth exemplary embodiment of the intermediate piston ring and disposed in a piston during an upward stroke of the piston.
Figure 23:
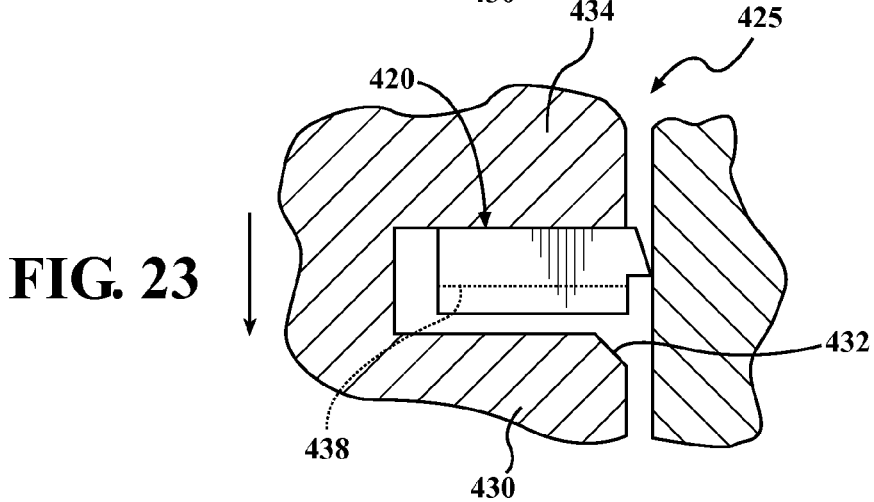
FIG. 23 is a cross-sectional view of the fifth exemplary embodiment of the intermediate piston ring and disposed in a piston during a downward stroke of the piston.

FIGS. 8-11 show a second exemplary embodiment of the piston ring 120 with like numerals, separated by a factor of 100, indicating corresponding parts with the above-described embodiment. Referring to FIG. 8, each of the end faces of the second embodiment has a radially inner portion 126 and a radially outer portion 124, and the radially outer portion 124 extends circumferentially further than the radially inner portion 126. As such, the piston ring 120 has a lesser gap at its outer diameter than at its inner diameter. As shown in the cross-sectional views of FIGS. 10 and 11, the outer portion 124 tapers from a top surface downwardly and radially outwardly towards the outer diameter to allow an increased flow of combustion gasses through from above the intermediate piston ring 120 to below the intermediate piston ring 120 via the chamfer 132 in the third land 130 during upward strokes of the piston 125. The greater thickness of the outer portion 124 at the top improves the seal against the second land 134 during the downward (intake and power) strokes of the piston 125.

Referring now to FIGS. 12-15, a third exemplary embodiment of an intermediate piston ring 220 is generally shown with like numerals, separated by a factor of 200, indicating corresponding parts with the above-described embodiments. As with the first and second exemplary embodiments described above, the third exemplary embodiment of the intermediate piston ring 220 is configured for use with a piston 225 having a chamfered third land 230. This embodiment of the intermediate piston ring 220 is similar to a conventional taper-faced ring but further includes an undercut 236 at each of the end faces that extends from a radially inwardly facing surface of the piston ring 220 towards but not all the way to a radially outwardly facing surface. The undercuts 236 also taper towards one another adjacent the radially outwardly facing surface. During the upward (compression and exhaust) strokes of the piston 225, combustion gasses flow through the undercut 236 and below the intermediate piston ring 220 via the chamfer 232 to below the intermediate piston ring 220. During the upward (power and intake) strokes, the piston ring 220 is pressed against the second land 234 and reverse blow-by is restricted.

Referring now to FIGS. 16-19, a fourth exemplary embodiment of the intermediate piston ring 320 is shown with like numerals, separated by a factor of 300, indicating corresponding parts with the above-described embodiments. This embodiment may be used with either a piston 325 having a chamfered or an un-chamfered third land 330. This embodiment of the intermediate piston ring 320 is similar to a conventional taper faced napier-style piston ring but also includes an undercut 336 at each of the end faces that extends from a radially inwardly facing surface of the piston ring 320 to an outer groove 337 formed into a radially outwardly facing surface of the piston ring 320. During the upward (compression and exhaust) strokes, combustion gasses flow through the undercut 336 to below the intermediate piston ring 320 via either a chamfer 332 in the third land 330 (if such a chamfer 332 is present) and/or the through the groove 337. During the downward (power and intake) strokes, the piston ring 320 is pressed against the second land 334 and reverse blow-by is restricted.

Referring now to FIGS. 20-23, a fifth exemplary embodiment of the intermediate piston ring 420 is generally shown with like numerals, separated by a factor of 400, indicating corresponding parts with the above-described embodiments. Similar to the fourth exemplary embodiment, the fifth embodiment includes an outer groove 437 but additionally includes a channel 438 which is spaced circumferentially from one of the end faces and extends from the radially inwardly facing surface of the piston ring 420 to the groove 437. During the upward (compression and exhaust) strokes, combustion gasses flow from through the channel 438 to below the piston ring 420 via either a chamfer 432 in the third land 430 (if the third land 430 has a chamfer 432) and/or via the groove. Although the exemplary intermediate piston ring 420 only has a single channel 438, it should be appreciated that the piston ring 420 could have any desirable number of channels 438 and those channels could be located on any desirable area of the piston ring 420. During the downward (power and intake) strokes, the piston ring 420 is pressed against the second land 434 and reverse blow-by is restricted.

Figure 24:
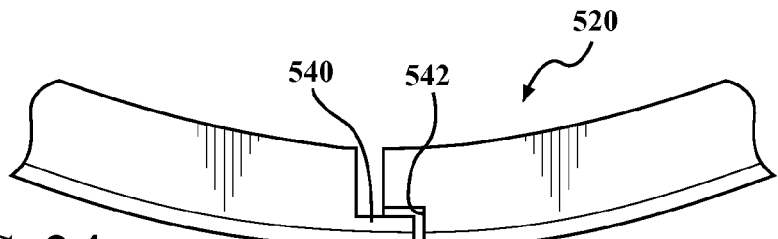
FIG. 24 is an enlarged top view of a sixth exemplary embodiment of the intermediate piston ring and centered on the ring gap.
Figure 25:
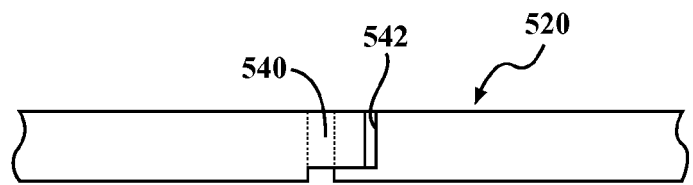
FIG. 25 is an enlarged front view of the sixth exemplary embodiment of the intermediate piston ring and centered on the ring gap.
Figure 26:
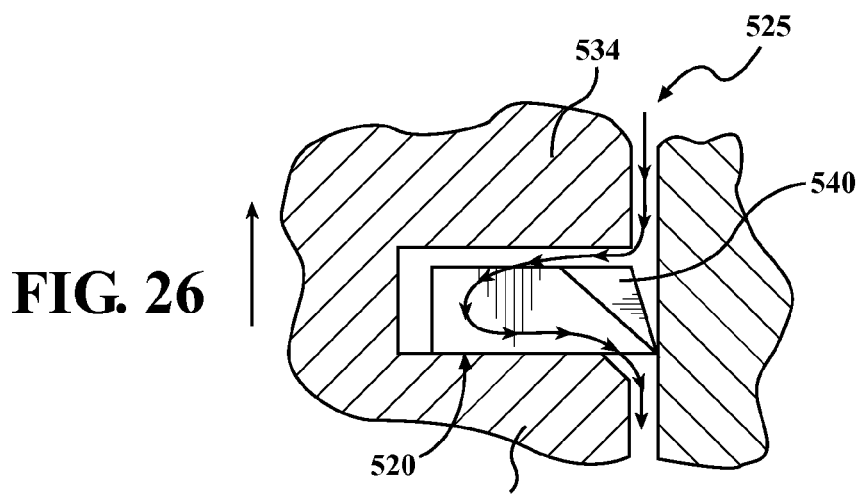
FIG. 26 is a cross-sectional view of the sixth exemplary embodiment of the intermediate piston ring and disposed in a piston during an upward stroke of the piston.
Figure 27:
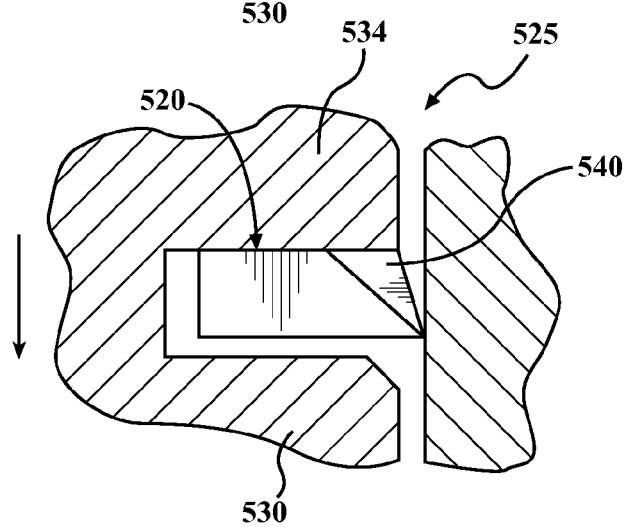
FIG. 27 is a cross-sectional view of the sixth exemplary embodiment of the intermediate piston ring and disposed in a piston during a downward stroke of the piston.

Referring now to FIGS. 24-27, a sixth exemplary embodiment of the intermediate piston ring 520 is generally shown with like numerals, separated by a factor of 500, indicating corresponding parts with the above-described embodiments. This embodiment may be used with either a piston 525 having a chamfered or an un-chamfered third land 530. As shown in FIGS. 24 and 25, the outer diameter of one of the end faces includes a finger 540 which extends circumferentially towards the other end face, and the other end face includes a notch 542 for receiving the finger 540. The gap between the finger 540 and the notch 542 is very small in comparison to the gap between the other portions of the end faces. This very small gap allows for improved oil scraping of the cylinder walls during operation of the engine. Referring now to FIGS. 26 and 27, the finger 540 has a generally triangular shape to present a channel for the flow of combustion gasses during the upward (compression and exhaust) strokes of the piston 525. During the downward (power and intake) strokes, the piston ring 520 is pressed against the second land 534 and reverse blow-by is restricted.

Obviously, many modifications and variations of the present invention are possible in light of the above teachings and may be practiced otherwise than as specifically described while within the scope of the appended claims.

What is claimed is:

1. A piston assembly, comprising:
 a piston body including at least two lands spaced axially from one another by a ring groove and one of said lands presenting a chamfer at an outer surface thereof;
 an intermediate piston ring disposed in said ring groove between said lands, said piston ring extending through an arcuate shape between opposite end faces and having an upper surface and a lower surface and an outer oil scraping edge which is axially located between said upper and lower surfaces; and
 said intermediate piston ring including a radially inwardly facing surface and a radially outwardly facing surface and wherein said piston body includes at least one undercut between said outer scraping edge and said lower surface that extends radially the full distance between said inwardly and outwardly facing surfaces for allowing combustion gasses to flow past said piston ring through said chamfer when said piston assembly is moving in only one axial direction with said piston ring being seated against said at least one land with said chamfer.

2. The piston assembly as set forth in claim 1 wherein said at least one undercut is located at one of said end faces of said piston ring.

3. The piston assembly as set forth in claim 2 wherein said at least one undercut is further defined as a pair of undercuts which are located on said opposite end faces of said piston ring.

4. The piston assembly as set forth in 1 wherein said end faces are free of channels.

5. A piston assembly, comprising:
 a piston body including at least two lands spaced axially from one another by a ring groove and one of said lands presenting a chamfer at an outer surface thereof;
 an intermediate piston ring disposed in said ring groove between said lands, said piston ring extending through an arcuate shape between opposite end faces and having an upper surface and a lower surface and an outer oil scraping edge which is axially located between said upper and lower surfaces; and
 said piston ring including at least one channel that is spaced circumferentially from said opposite end faces and extends between a radially inwardly facing surface of said piston ring and a radially outwardly facing surface of said piston ring for allowing a greater flow of combustion gasses to pass said piston ring when said piston body is moving in one direction and for allowing a lesser flow of combustion gasses to pass said piston ring when said piston is moving in an opposite direction.

* * * * *